(12) United States Patent
Yamada et al.

(10) Patent No.: US 8,556,717 B2
(45) Date of Patent: Oct. 15, 2013

(54) COMPUTER-READABLE STORAGE MEDIUM HAVING STORED THEREIN MUSICAL SOUND GENERATION PROGRAM, AND MUSICAL SOUND GENERATION APPARATUS

(75) Inventors: Yoichi Yamada, Kyoto (JP); Junya Osada, Kyoto (JP); Arisa Hosaka, Kyoto (JP); Eiji Aonuma, Kyoto (JP); Toru Minegishi, Kyoto (JP); Daiki Iwamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 446 days.

(21) Appl. No.: 12/651,111

(22) Filed: Dec. 31, 2009

(65) Prior Publication Data

US 2011/0105230 A1    May 5, 2011

(30) Foreign Application Priority Data

Oct. 30, 2009    (JP) .................................. 2009-250671

(51) Int. Cl.
   *A63F 9/24*    (2006.01)
(52) U.S. Cl.
   USPC ................... 463/35; 463/30; 463/44; 381/56; 345/4

(58) Field of Classification Search
   USPC ........................ 463/30, 35, 44; 381/56; 345/4
   See application file for complete search history.

(56) References Cited

U.S. PATENT DOCUMENTS

| 6,456,737 | B1 * | 9/2002 | Woodfill et al. | 382/154 |
| 2003/0190950 | A1 * | 10/2003 | Matsumoto | 463/30 |
| 2009/0051623 | A1 * | 2/2009 | Paul et al. | 345/4 |
| 2009/0104954 | A1 * | 4/2009 | Weber et al. | 463/1 |
| 2009/0153478 | A1 * | 6/2009 | Kerr et al. | 345/158 |
| 2010/0165215 | A1 * | 7/2010 | Shim | 348/734 |

FOREIGN PATENT DOCUMENTS

| JP | 2002-229563 | 8/2002 |
| JP | 2006-145851 | 6/2006 |

* cited by examiner

*Primary Examiner* — Arthur O. Hall
*Assistant Examiner* — Shahid Kamal
(74) *Attorney, Agent, or Firm* — Nixon & Vanderhye, P.C.

(57) ABSTRACT

A user can move the position of a pan flute in a horizontal direction on a screen by sliding a touch position in the horizontal direction on the screen while touching a touch panel with a stick. Moreover, when the user blows on a microphone hole, a musical sound of a pitch corresponding to a pipe of the pan flute which is displayed in an overlapping manner with a valid position display image at this time is outputted via a sound hole.

14 Claims, 14 Drawing Sheets

F I G. 8

| MUSICAL SOUND GENERATION PROGRAM | | | |
|---|---|---|---|
| PAN FLUTE DATA | | | |
| PIPE | PITCH | COLOR | POSITION |
| FIRST PIPE | A | WHITE | Xa |
| SECOND PIPE | B | RED | Xb |
| THIRD PIPE | C | BLUE | Xc |
| FOURTH PIPE | D | GREEN | Xd |
| FIFTH PIPE | E | YELLOW | Xe |
| SIXTH PIPE | F | BLACK | Xf |
| IMAGE DATA | | | |
| PAN FLUTE IMAGE | | | |
| VALID POSITION DISPLAY IMAGE | | | |
| CHARACTER IMAGE | | | |
| MUSICAL SCORE IMAGE | | | |
| MUSICAL SCORE DATA | | | |
| MUSICAL SOUND DATA | | | |

COMPUTER-READABLE STORAGE MEDIUM HAVING STORED THEREIN MUSICAL SOUND GENERATION PROGRAM, AND MUSICAL SOUND GENERATION APPARATUS

CROSS REFERENCE TO RELATED APPLICATION

The disclosure of Japanese Patent Application No. 2009-250671, filed on Oct. 30, 2009, is incorporated herein by reference.

BACKGROUND OF THE INVENTION

1. Field of the Invention

The present invention relates to a computer-readable storage medium having stored therein a musical sound generation program, and a musical sound generation apparatus, and for example, relates to a computer-readable storage medium having stored therein a musical sound generation program for generating a musical sound in accordance with a user's operation, and a musical sound generation apparatus for generating a musical sound in accordance with a user's operation.

2. Description of the Background Art

Conventionally, there has been known a technique for generating a musical sound in accordance with a position on a screen designated by a user. For example, Japanese Laid-Open Patent Publication No. 2002-229563 discloses an electronic apparatus including an LCD for displaying a keyboard and a touch panel provided so as to cover the LCD, which electronic apparatus, in accordance with an input performed by the user with a pen to the touch panel, detects which key is pressed, and outputs from a speaker a musical sound of a pitch corresponding to the pressed key.

However, although being suitable for simulating a musical instrument, such as the piano, which is placed in a fixed manner with respect to a performer during a performance, an electronic apparatus as described above cannot provide a feeling of intuitive operation when simulating a musical instrument, such as the pan flute or the harmonica, which is moved in an up-and-down or side-to-side direction by a performer during a performance.

SUMMARY OF THE INVENTION

Therefore, an object of the present invention is to provide a musical sound generation apparatus which allows a user to perform an intuitive operation even in the case of simulating a musical instrument, such as the pan flute or the harmonica, which is moved in an up-and-down or side-to-side direction by a performer during a performance.

The present invention has the following features to achieve the object mentioned above.

A computer-readable storage medium of the present invention has stored therein a musical sound generation program for generating a musical sound signal in accordance with an input operation performed by a user, the musical sound generation program causing the computer of an information processing apparatus to function as display control means, movement control means, detection means, input determination means, and generation means.

The display control means displays on a screen a plurality of images which respectively correspond to a plurality of pitches. The movement control means moves positions of the plurality of images displayed on the screen by the display control means, in accordance with a first input performed by the user via first input means. The detection means detects that at least one image of the plurality of images which are moved by the movement control means is positioned at a predetermined position on the screen. The input determination means determines whether or not a second input is being performed by the user via second input means. The generation means, when a result of the determination by the input determination means is positive, based on the at least one image which is detected by the detection means as being positioned at the predetermined position on the screen, generates the musical sound signal of the pitch corresponding to the at least one image.

Moreover, the movement control means may move the plurality of images as one unit in accordance with the first input.

Moreover, the display control means may display the plurality of images such that the plurality of images are arranged in order of pitch.

Moreover, the first input means may be a pointing device, and the movement control means, when the user moves a position on the screen designated by the pointing device, may move the positions of the plurality of images accordingly.

Moreover, the first input means may be a touch panel provided on the screen. Thus, an intuitive operation which makes the user feel as if they are actually moving a musical instrument is enabled.

Moreover, the second input means may be a microphone, and the input determination means may determine whether or not an input to the microphone is being performed by the user.

Moreover, the predetermined position includes a point, on the screen, which is the nearest to the microphone. Thus, more intuitive operation is enabled.

Note that the musical sound generation program may further cause the computer to function as pitch determination means for determining whether or not the pitch corresponding to the at least one image which is detected by the detection means as being positioned at the predetermined position on the screen coincides with a pitch designated by musical score data stored in storage means. In addition, the generation means, (1) when a result of the determination by the pitch determination means is positive, if an input value (for example, an input duration time of a microphone input, or an amplitude of a microphone input in an embodiment described later) based on the second input is equal to or larger than a first threshold value, may generate a musical sound signal of the pitch corresponding to the at least one image, and (2) when a result of the determination by the pitch determination means is negative, if the input value is equal to or larger than a second threshold value which is larger than the first threshold value, may generate the musical sound signal of the pitch corresponding to the at least one image. Thus, erroneous operation can be prevented from being performed when the user tries to generate a musical sound signal corresponding to musical score data, and at the same time, the user can generate a musical sound signal which is not corresponding to the musical score data.

Moreover, the display control means may include indicator display control means for displaying a predetermined indicator at the predetermined position. Thus, the user can easily recognize the predetermined position, thereby improving operability.

Moreover, the display control means may include indicator color changing means for changing a color of the indicator in accordance with the at least one image which is detected by the detection means as being positioned at the predetermined position on the screen. Thus, the user can easily recognize an image positioned at the predetermined position, thereby improving operability.

Moreover, the musical sound generation program may further cause the computer to function as changing means for changing a size of the predetermined position in accordance with the first input or the second input. Thus, more various musical sound signals can be generated.

Note that the above-described computer-readable storage medium may be, for example, a flexible disk, a hard disk, an optical disk, a magnet-optical disk, a CD-ROM, a CD-R, a magnetic tape, a nonvolatile semiconductor, a memory card, or a ROM.

A musical sound generation apparatus of the present invention generates a musical sound in accordance with an input operation performed by a user, the musical sound generation apparatus including display control means, movement control means, detection means, input determination means, and generation means.

The display control means displays on a screen a plurality of images which respectively correspond to a plurality of pitches. The movement control means moves positions of the plurality of images displayed on the screen by the display control means, in accordance with a first input performed by the user via first input means. The detection means detects that at least one image of the plurality of images which are moved by the movement control means is positioned at a predetermined position on the screen. The input determination means determines whether or not a second input is being performed by the user via second input means. The generation means, when a result of the determination by the input determination means is positive, based on the at least one image which is detected by the detection means as being positioned at the predetermined position on the screen, generates the musical sound signal of the pitch corresponding to the at least one image.

The present invention allows a user to perform an intuitive operation even in the case of simulating a musical instrument, such as the pan flute or the harmonica, which is moved in an up-and-down or side-to-side direction by a performer during a performance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows an example of a memory map of a RAM;

DESCRIPTION OF THE PREFERRED EMBODIMENTS

Hereinafter, an embodiment of the present invention will be described.

Figure 1:
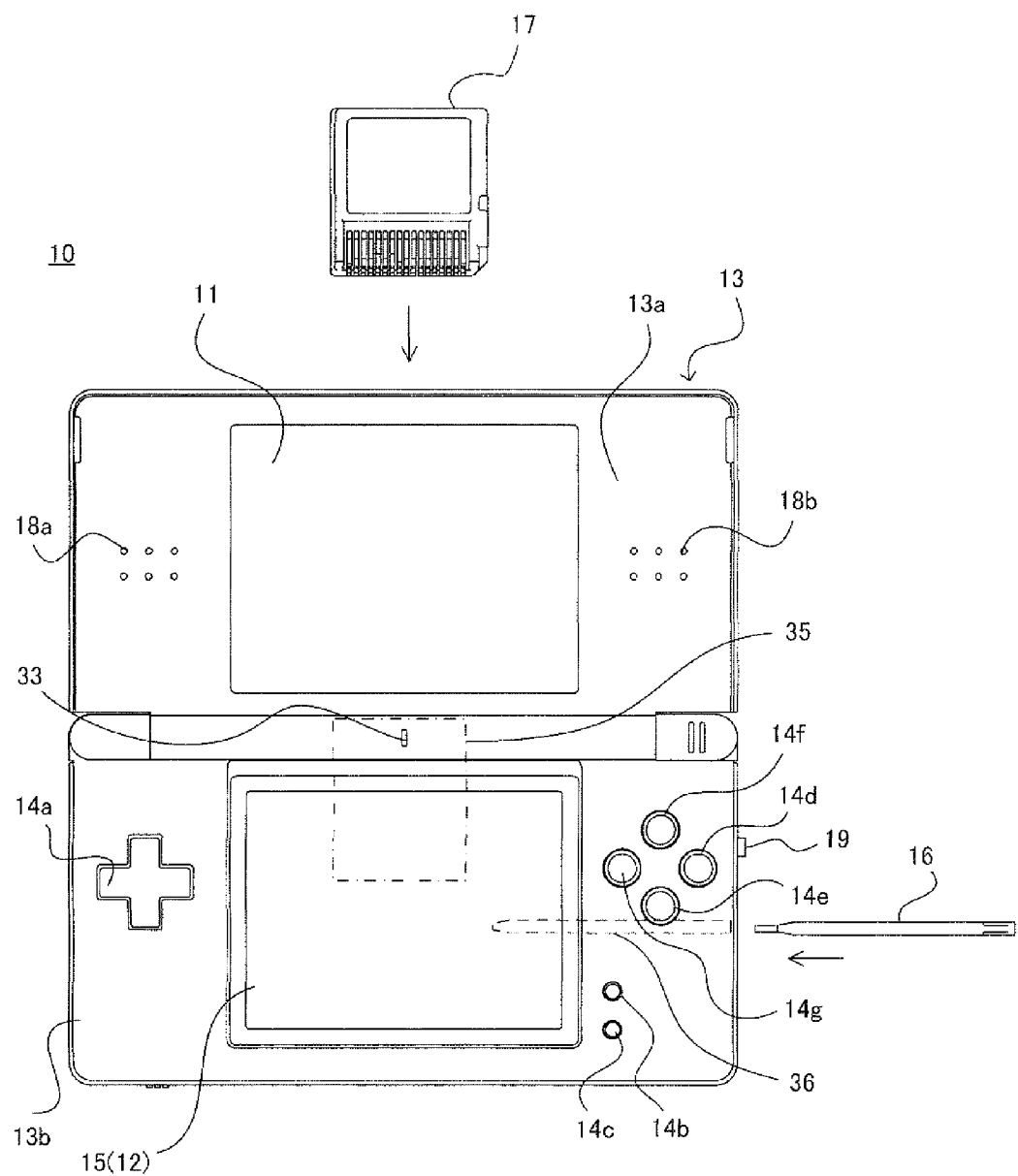
FIG. 1 is an external view of a game apparatus according to an embodiment of the present invention.

FIG. 1 is an external view of a game apparatus according to the embodiment of the present invention. Note that the present invention is not limited to a hand-held game apparatus and is also applicable to a stationary game apparatus. Further, the present invention is not limited to a game apparatus, and is applicable to any information processing apparatus (for example, a personal computer, a mobile phone, a television receiver, and a DVD player) having a function of displaying a video content.

As shown in FIG. 1, the game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The resolutions of the first LCD 11 and the second LCD 12 are both 256 dots×192 dots. Note that although LCDs are used as display devices in the present embodiment, any other display devices such as display devices using EL (Electro Luminescence) may be used, for example. Also, the LCDs may have any resolutions.

The upper housing 13a is provided with sound holes 18a and 18b for outputting, to the exterior, sounds produced by a pair of speakers (30a and 30b in FIG. 2) described later. Moreover, a microphone hole 33 is provided at a hinge portion which connects the upper housing 13a and the lower housing 13b such that the game apparatus 10 can be opened and closed.

The lower housing 13b is provided with, as an input device, a cross switch 14a, a start switch 14b, a select switch 14c, an A-button 14d, a B-button 14e, an X-button 14f, and a Y-button 14g. An L-button and an R-button, which are not shown, are provided at a side surface of the lower housing 13b. In addition, a touch panel 15 is provided on a screen of the second LCD 12, as another input device. A power switch 19, an insertion opening 35 (indicated by a dot-dashed line in FIG. 1) for establishing a connection with a memory card 17, and an insertion opening 36 (indicated by a dot line in FIG. 1) for storing a stick 16, are provided at a side surface of the lower housing 13b.

The touch panel 15 may be of any type such as a resistive film type, an optical type (infrared type), or a capacitive coupling type. The touch panel 15 can be operated not only by the stick 16, but also by a finger. The touch panel 15 used in the present embodiment has the same resolution (detection accuracy) of 256 dots×192 dots as that of the second LCD 12. However, the resolutions of the touch panel 15 and the second LCD 12 may not necessarily coincide with each other.

The memory card 17 includes a ROM 17a for storing a game program and a flash 17b for storing backup data in a rewritable manner, and is placed, in a removable manner, in the insertion opening 35 provided at the lower housing 13b. Although not shown in FIG. 1, a connector 23 (see FIG. 2) to be connected with a connector provided at the front end in the insertion direction of the memory card 17 is provided at the back of the insertion opening 35. By inserting the memory card 17 into the insertion opening 35, these connectors are connected with each other, thereby enabling a CPU core 21 (see FIG. 2) of the game apparatus 10 to access the memory card 17.

Figure 2:
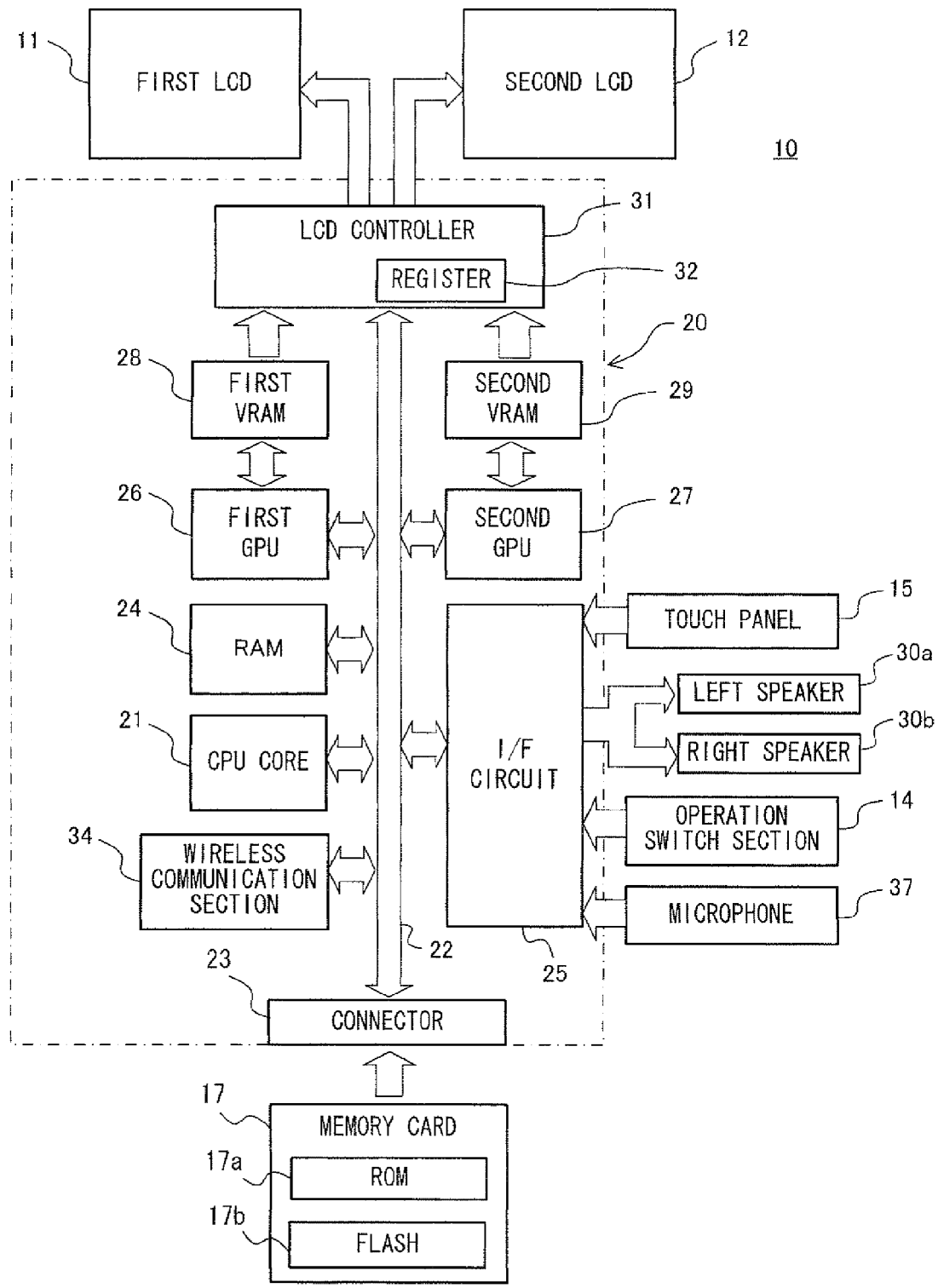
FIG. 2 is an internal configuration diagram of the game apparatus.

Next, an internal configuration of the game apparatus 10 will be described with reference to FIG. 2. FIG. 2 is a block diagram showing the internal configuration of the game apparatus 10. As shown in FIG. 2, the CPU core 21 is mounted on an electronic circuit board 20 which is housed in the housing 13. Via a bus 22, the CPU core 21 is connected to the connector 23, an input/output interface circuit (referred to as an I/F circuit in the diagram) 25, a first GPU (Graphics Processing Unit) 26, a second GPU 27, a RAM 24, an LCD controller 31, and a wireless communication section 34. The memory card 17 is connected to the connector 23 in a removable manner. The I/F circuit 25 is connected to the touch panel 15, the left speaker 30a, the right speaker 30b, the operation switch section 14 including the cross switch 14a, the A-button 14d, and the like shown in FIG. 1, and the microphone 37. The left speaker 30a and the right speaker 30b are positioned inside the sound holes 18a and 18b, respectively. The microphone 37 is positioned inside the microphone hole 33.

A first VRAM (Video RAM) 28 is connected to the first GPU 26, and a second VRAM 29 is connected to the second GPU 27. In accordance with an instruction from the CPU core 21, the first GPU 26 generates a first display image and draws the first display image into the first VRAM 28. Similarly, in accordance with an instruction from the CPU core 21, the second GPU 27 generates a second display image and draws the second display image into the second VRAM 29. The first VRAM 28 and the second VRAM 29 are connected to the LCD controller 31.

The LCD controller 31 includes a register 32. The register 32 stores a value of 0 or 1 in accordance with an instruction from the CPU core 21. When the value stored in the register 32 is 0, the LCD controller 31 outputs to the first LCD 11 the first display image which has been drawn into the first VRAM 28, and outputs to the second LCD 12 the second display image which has been drawn into the second VRAM 29. On the other hand, when the value stored in the register 32 is 1, the first display image which has been drawn into the first VRAM 28 is outputted to the second LCD 12, and the second display image which has been drawn into the second VRAM 29 is outputted to the first LCD 11.

The wireless communication section 34 has a function of transmitting data to and receiving data from a wireless communication section of another game apparatus. Moreover, the game apparatus 10 can be connected to a wide area network such as the Internet via the wireless communication section 34, and also, can perform a communication with another game apparatus via the network.

In the present embodiment, the CPU core 21 of the game apparatus 10 executes a musical sound generation program which has been loaded into the RAM 24 from the ROM 17a of the memory card 17, or the like. Hereinafter, referring to FIG. 3 to FIG. 7, an outline of operation of the game apparatus 10 based on the musical sound generation program will be described.

Figure 3:
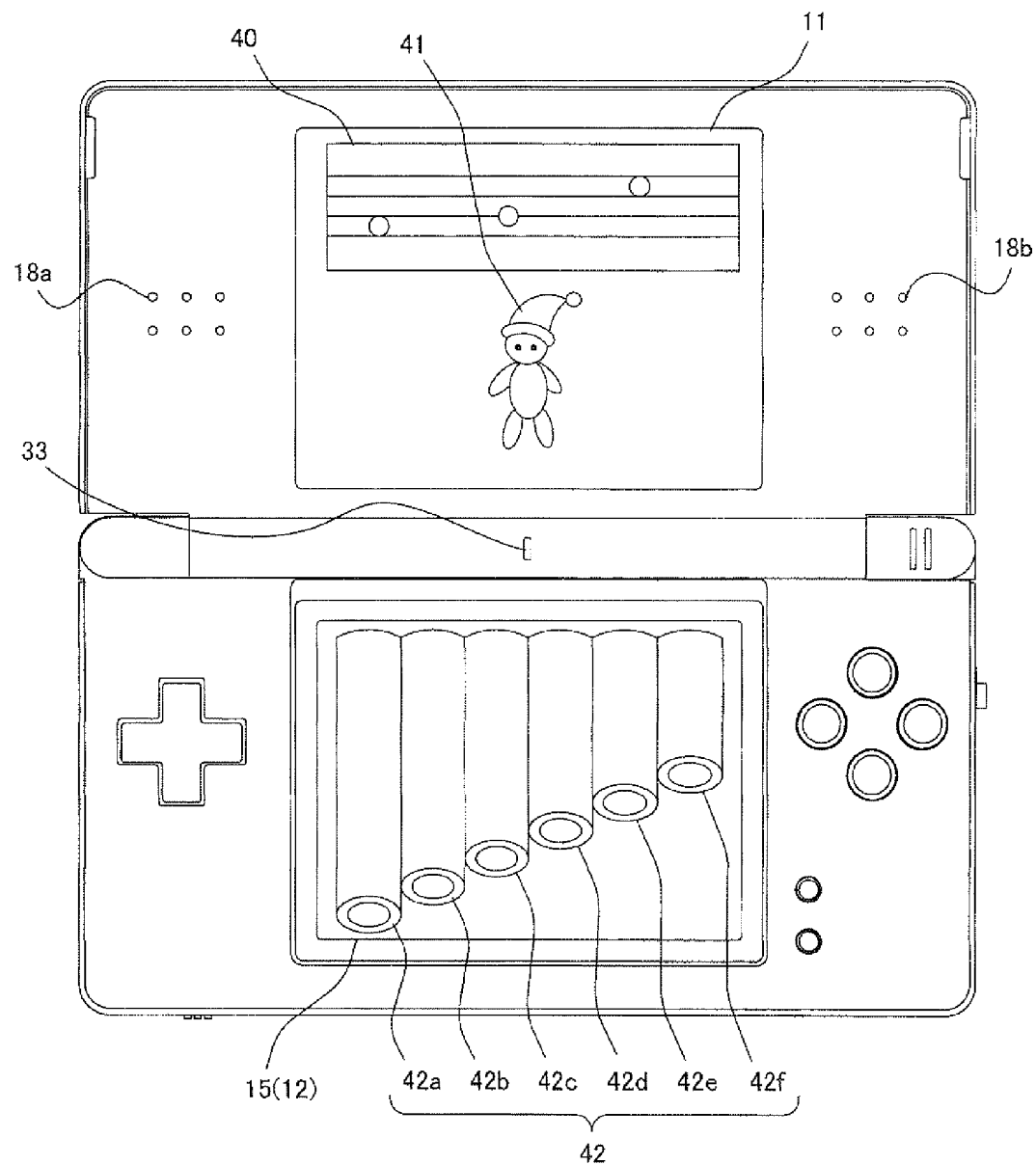
FIG. 3 shows an example of an image displayed during a play of a game.

FIG. 3 shows initial images displayed on the first LCD 11 and the second LCD 12 based on the musical sound generation program. As shown in FIG. 3, a musical score 40 and a character 41 are displayed on the first LCD 11, and a pan flute 42 is displayed on the second LCD 12.

The musical score 40 is an image indicating a musical score of a musical piece to be performed. The character 41 is an image indicating a character playing the pan flute in a virtual game world.

The pan flute 42 includes six pipes (a first pipe 42a to a sixth pipe 42f) respectively corresponding to pitches different from each other. In the present embodiment, the first pipe 42a corresponds to a pitch "A", the second pipe 42b corresponds to a pitch "B", the third pipe 42c corresponds to a pitch "C", the fourth pipe 42d corresponds to a pitch "D", the fifth pipe 42e corresponds to a pitch "E", and the sixth pipe 42f corresponds to a pitch "F" (see FIG. 8). The six pipes are displayed in colors different from each other. In the present embodiment, the first pipe 42a is displayed in "white", the second pipe 42b is displayed in "red", the third pipe 42c is displayed in "blue", the fourth pipe 42d is displayed in "green", the fifth pipe 42e is displayed in "yellow", and the sixth pipe 42f is displayed in "black" (see FIG. 8).

Figure 4:
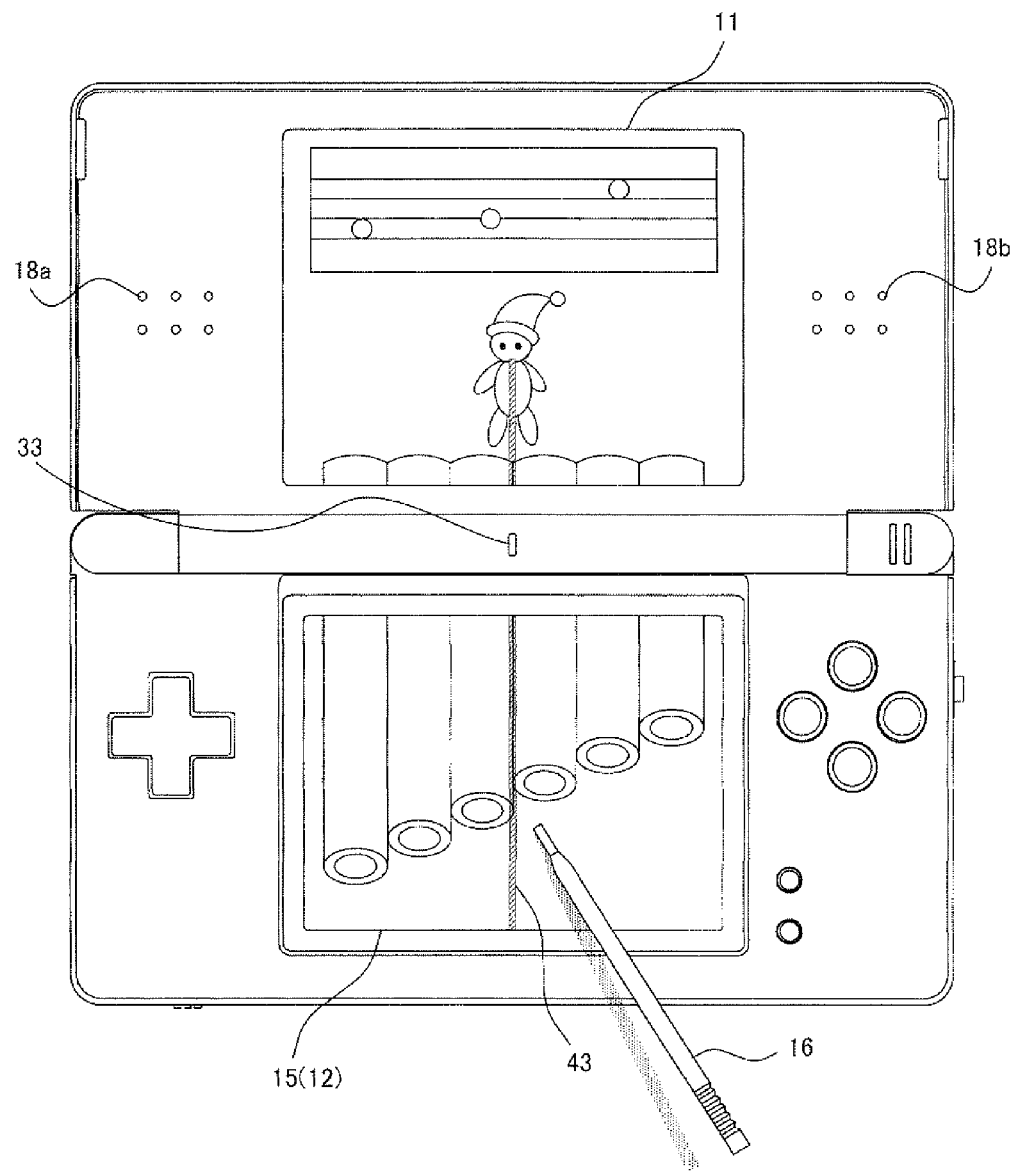
FIG. 4 shows an example of a touch operation performed by a user.

When a user touches any point on the touch panel 15b with the stick 16, the images displayed on the first LCD 11 and the second LCD 12 are changed to images shown in FIG. 4. That is, a display position of the pan flute 42 is changed from an initial position shown in FIG. 3 to a performance position (position slightly shifted from the initial position in an upward direction on the screen) shown in FIG. 4. In addition, a valid position display image 43, which is linear and extends in the vertical direction on a screen, is displayed. Details of the valid position display image 43 will be described later. Note that when the user takes the stick 16 off the touch panel 15, the images displayed on the first LCD 11 and the second LCD 12 are returned to the initial images shown in FIG. 3.

By sliding a touch position in the horizontal direction on the screen while touching the touch panel 15 with the stick 16 (hereinafter, such an operation is referred to as "slide operation"), the user can move, in the horizontal direction on the screen, a position of the pan flute 42 displayed on the first LCD 11 and the second LCD 12.

Figure 5:
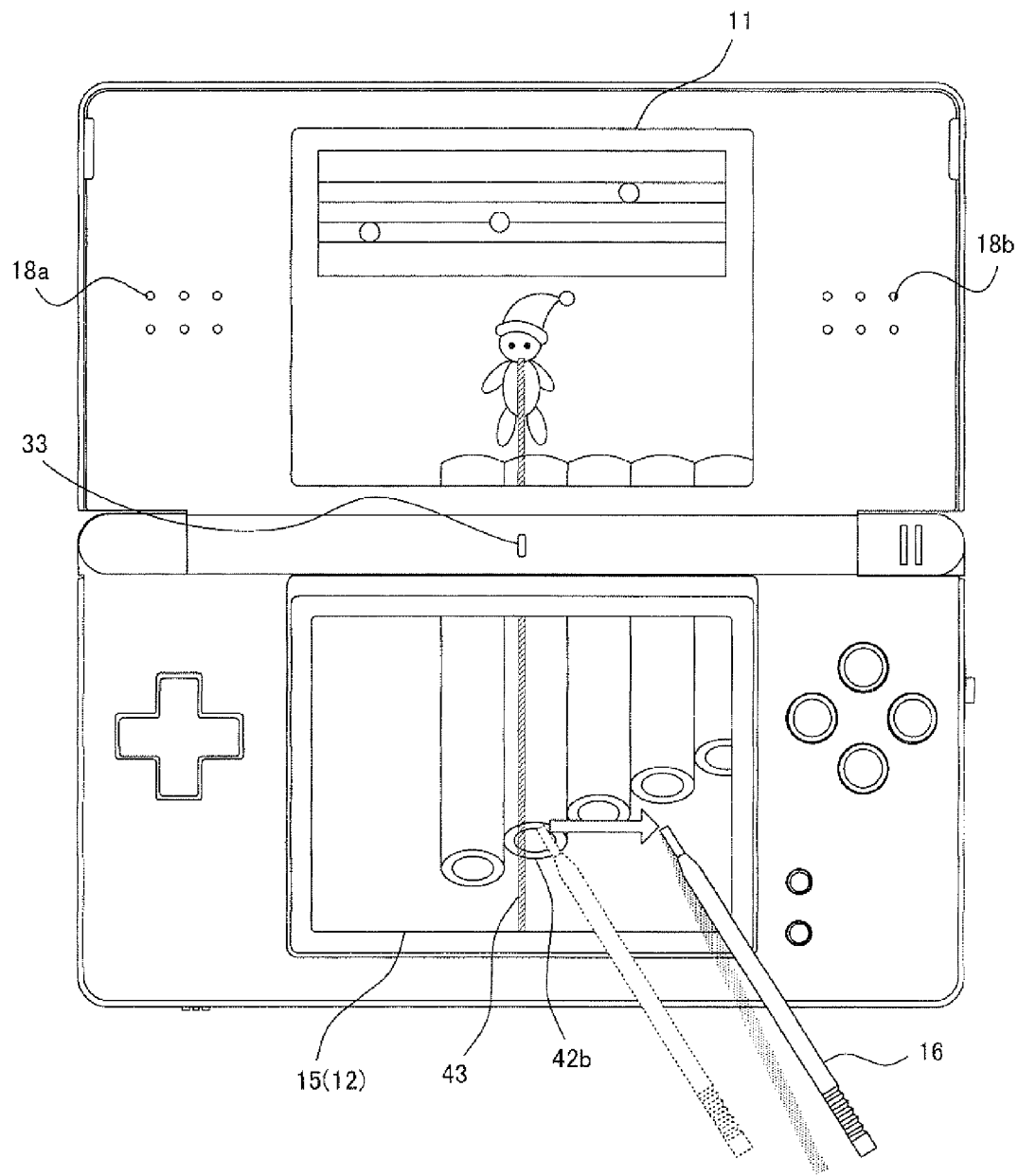
FIG. 5 shows an example of a touch operation performed by the user.

FIG. 5 shows a slide operation being performed rightward on the screen by the user, starting from the state shown in FIG. 4. When the user performs a slide operation rightward on the screen, the pan flute 42 moves rightward on the screen accordingly. The amount of movement of the pan flute 42 is proportional to the amount of movement of the stick 16 during the slide operation.

Note that a color of the valid position display image 43 is the same as that of a pipe displayed in an overlapping manner with the valid position display image 43. Therefore, in a state shown in FIG. 5, a color of the valid position display image 43 is "red" which is the same as the second pipe 42b displayed in an overlapping manner with the valid position display image 43.

In the state shown in FIG. 5, when the user blows on the microphone hole 33, a musical sound of the pitch "B", which corresponds to the second pipe 42b displayed in an overlapping manner with the valid position display image 43 at this time, is outputted through the sound holes 18a and 18b. That is, when the user blows on the microphone hole 33, a musical sound of the pitch which corresponds to a pipe displayed in an overlapping manner with the valid position display image 43 at this time is outputted.

Note that in the present embodiment, when, as shown in FIG. 3, the user is not touching the touch panel 15 with the stick 16, a musical sound is not outputted even if the user blows on the microphone hole 33.

Figure 6:
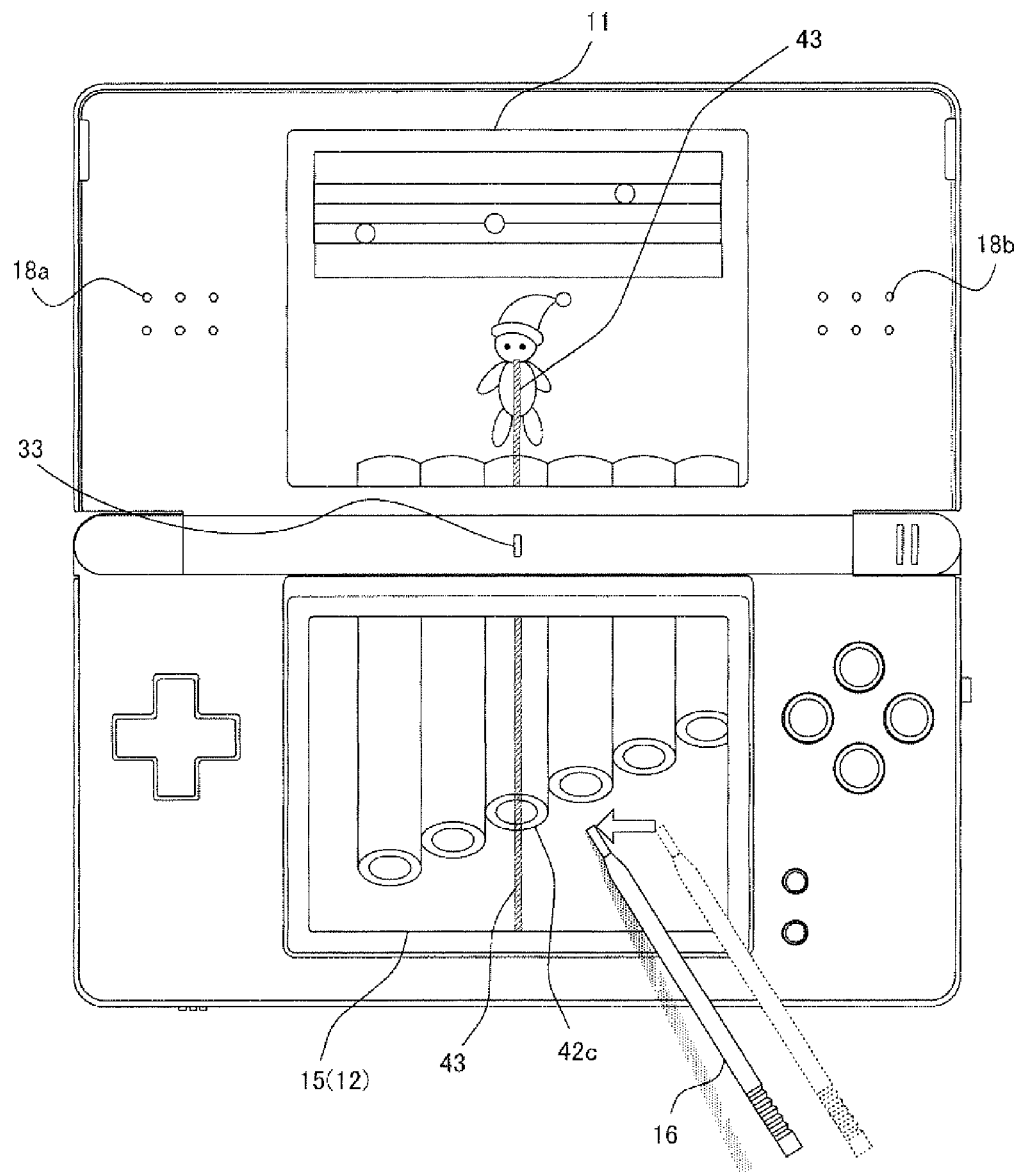
FIG. 6 shows an example of a touch operation performed by the user.

FIG. 6 shows a slide operation being performed leftward on the screen by the user, starting from the state shown in FIG. 5. When the user performs a slide operation leftward on the screen, the pan flute 42 moves leftward on the screen accordingly. The amount of movement of the pan flute 42 is proportional to the amount of movement of the stick 16 during the slide operation.

Note that a color of the valid position display image 43 is "blue" which is the same as the third pipe 42c displayed in an overlapping manner with the valid position display image 43.

In the state shown in FIG. 6, when the user blows on the microphone hole 33, a musical sound of the pitch "C", which corresponds to the third pipe 42c displayed in an overlapping manner with the valid position display image 43 at this time, is outputted through the sound holes 18a and 18b.

Figure 7:
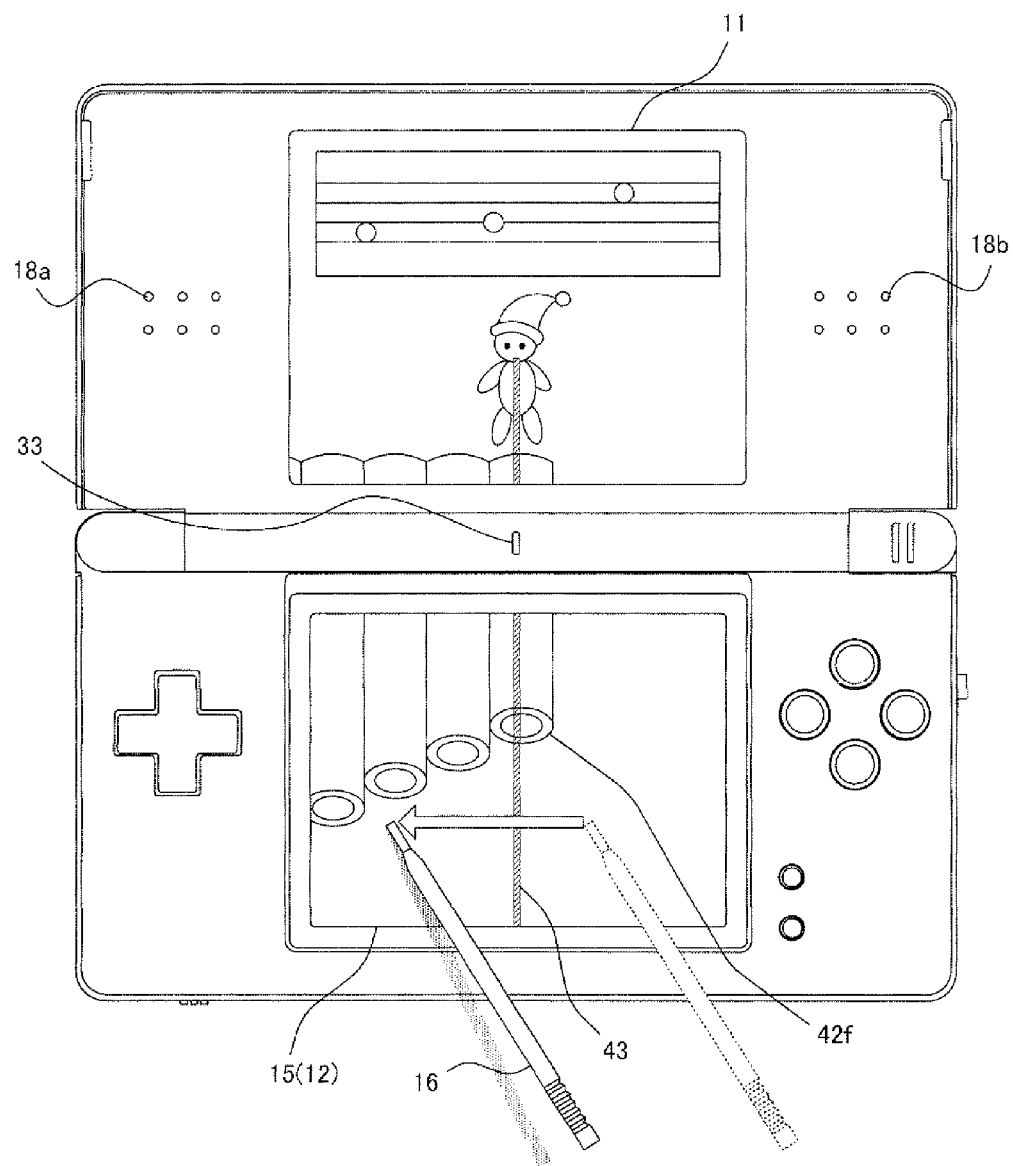
FIG. 7 shows an example of a touch operation performed by the user.

FIG. 7 shows a slide operation being further performed leftward on the screen by the user, starting from a state shown in FIG. 6. When the user further performs a slide operation leftward on the screen, the pan flute 42 further moves, from its position in FIG. 6, leftward on the screen accordingly.

Note that a color of the valid position display image 43 is "black" which is the same as the sixth pipe 42f displayed in an overlapping manner with the valid position display image 43.

In the state shown in FIG. 7, when the user blows on the microphone hole 33, a musical sound of the pitch "F", which corresponds to the sixth pipe 42f displayed in an overlapping manner with the valid position display image 43 at this time, is outputted through the sound holes 18a and 18b.

As described above, the user moves the pan flute 42 through a slide operation such that a pipe corresponding to a desired pitch moves to a position indicated by the valid position display image 43, and blows on the microphone hole 33, thereby enabling a musical sound of the desired pitch to be outputted.

Note that the game apparatus 10 may determine whether or not the user has properly performed a musical piece as directed by the musical score 40, and a predetermined event (in which, for example, the character 41 obtains a reward) may be caused in the virtual game world in accordance with a result of the determination.

Next, operation of the game apparatus 10 based on the musical sound generation program will be described in further detail.

FIG. 8 shows a program and a part of data which are stored in the RAM 24 at the time of execution of the musical sound generation program. In the RAM 24, the musical sound generation program, pan flute data, image data, musical score data, musical sound data, and the like are stored.

The pan flute data includes data indicating pitches, colors, positions (positions in a virtual game space) of the first pipe 42a to the sixth pipe 42f. Note that the positions of the pipes are updated in accordance with the aforementioned slide operation.

The image data includes a pan flute image, a valid position display image, a character image, and a musical score image.

The musical score data is data (for example, data including a plurality of pitches arranged in chronological order) indicating a musical piece to be performed by the user.

The musical sound data is data for generating a musical sound signal of a sound of the pan flute.

Figure 9:
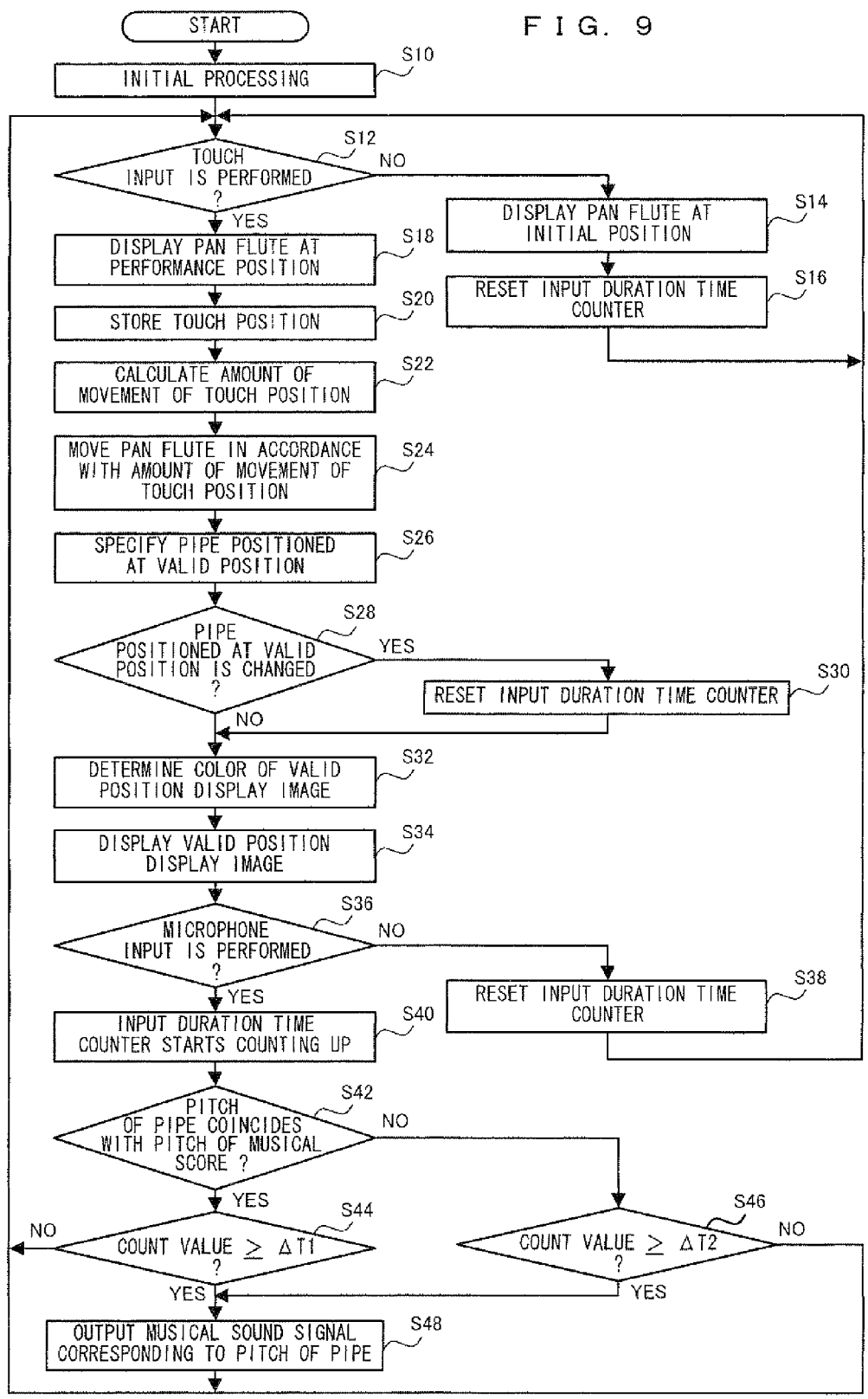
FIG. 9 shows a flow of processing executed by a CPU core.

Next, referring to a flowchart in FIG. 9, a flow of processing executed based on the musical sound generation program by the CPU core 21 of the game apparatus 10 will be described.

When an execution of the musical sound generation program is started, first, the CPU core 21 performs initial processing in step S10. The initial processing includes processing for displaying the initial screen shown in FIG. 3, processing for setting 0 as an initial value for an input duration time counter described later, and the like. Thereafter, processing proceeds to step S12.

In step S12, based on a signal from the touch panel 15, the CPU core 21 determines whether or not a touch input is being performed (that is, whether or not the user is touching the touch panel 15 with the stick 16, a finger, or the like). Then, if it is determined that a touch input is being performed, processing proceeds to step S18, and if it is determined that a touch input is not being performed, processing proceeds to step S14.

In step S14, the CPU core 21 displays the pan flute at the aforementioned initial position (see FIG. 3). Thereafter, processing proceeds to step S16.

In step S16, the CPU core 21 resets an input duration time counter to 0. The input duration time counter is a timer for measuring a time during which the user continues to blow on the microphone hole 33 in a state where a pipe overlapping with the valid position display image 43 is not changed, and a count value thereof is stored in the RAM 24 and updated by the CPU core 21 (step S40 described later). Thereafter, processing returns to step S12.

In step S18, the CPU core 21 displays the pan flute 42 at the aforementioned performance position (see FIG. 4 to FIG. 7). Thereafter, processing proceeds to step S20.

In step S20, the CPU core 21 stores, in the RAM 24, the touch position (2-dimensional coordinate value) which is detected based on a signal from the touch panel 15. Thereafter, processing proceeds to step S22.

In step S22, the CPU core 21 calculates the amount of movement of the touch position with respect to the horizontal direction on the screen, based on the latest touch position and a touch position just prior to the latest touch position which are stored in the RAM 24. Thereafter, processing proceeds to step S24.

In step S24, the CPU core 21 moves the pan flute 42 in the virtual game space, in accordance with the amount of movement of the touch position calculated in step S22. Specifically, for example, positions (Xa to Xf) of the pipes included in the pan flute data (see FIG. 8) stored in the RAM 24 are updated in accordance with the amount of movement of the touch position calculated in step S22. Thereafter, processing proceeds to step S26.

In step S26, the CPU core 21 specifies, among the first pipe 42a to the sixth pipe 42, a pipe which is positioned at the valid position (that is, a pipe which is displayed in an overlapping manner with the valid position display image 43), based on the positions (Xa to Xf) of the pipes updated in step S24, and stores information for identifying the specified pipe in the RAM 24. Thereafter, processing proceeds to step S28.

In step S28, the CPU core 21 determines whether or not a pipe positioned at the valid position is changed from one to another in the result of the movement of the pan flute in step S24. Then, if a pipe positioned at the valid position is changed, processing proceeds to step S30, and if a pipe positioned at the valid position is not changed, processing proceeds to step S32.

In step S30, the CPU core 21 resets the input duration time counter to 0. Thereafter, processing proceeds to step S32.

In step S32, the CPU core 21 determines a color of the valid position display image 43 in accordance with a pipe positioned at the valid position. Specifically, a color of a pipe positioned at the valid position is obtained based on the pan flute data (see FIG. 8) stored in the RAM 24, and the same color as that of the obtained pipe is determined as a color of the valid position display image 43. Thereafter, processing proceeds to step S34.

In step S34, the CPU core 21 displays the valid position display image 43 in the color determined in step S32.

In step S36, it is determined whether or not a microphone input is being performed (that is, whether or not the user is blowing on the microphone hole 33), based on an input signal from the microphone 37. Then, if a microphone input is being performed, processing proceeds to step S40, and if a microphone input is not being performed, processing proceeds to step S38.

Note that various methods can be adopted as a method for determining whether or not a microphone input is being performed. For example, the determination may be performed based on the amplitude (that is, the volume of a microphone input) of an input signal from the microphone 37. Alternatively, by analyzing a feature of a waveform of an input signal from the microphone 37, it may be determined whether the user is blowing on the microphone hole 33 or just uttering a word, and only if the user is blowing on the microphone hole 33, it may be determined that a microphone input is being performed (for example, see paragraphs [0085] to [0096] of Japanese Laid-Open Patent Publication No. 2006-145851).

In step S38, the CPU core 21 resets the input duration time counter to 0. Thereafter, processing returns to step S12.

In step S40, the CPU core 21 causes the input duration time counter to count up (for example, to increment a count value). Thereafter, processing proceeds to step S42.

In step S42, with reference to the musical score data stored in the RAM 24, the CPU core 21 determines whether or not a pitch of a pipe positioned at the valid position coincides with a pitch indicated by the musical score (that is, a pitch at which the user should perform at this time). Then, if both the pitches coincide with each other, processing proceeds to step S44, and if both the pitches do not coincide with each other, processing proceeds to step S46.

In step S44, the CPU core 21 determines whether or not the count value of the input duration time counter is equal to or larger than a predetermined first threshold value $\Delta T1$. Then, if a count value of the input duration time counter is equal to or larger than the first threshold value $\Delta T1$, processing proceeds to step S48, and otherwise, processing returns to step S12. Note that the first threshold value $\Delta T1$ only needs to be equal to or larger than 0.

In step S46, the CPU core 21 determines whether or not the count value of the input duration time counter is equal to or larger than a predetermined second threshold value $\Delta T2$. Note that the second threshold value $\Delta T2$ is equal to or larger than the first threshold value $\Delta T1$. Then, if a count value of the input duration time counter is equal to or larger than the second threshold value $\Delta T2$, processing proceeds to step S48, and otherwise, processing returns to step S12.

In step S48, the CPU core 21 generates a musical sound signal corresponding to a pitch of a pipe positioned at the valid position, based on the musical sound data stored in the RAM 24, and outputs the musical sound signal to the left speaker 30a and the right speaker 30b. Thereafter, processing proceeds to step S12.

Note that in the present embodiment, the threshold value used in the subsequent step is changed depending on a result of the determination in step S42 (the first threshold value $\Delta T1$ and the second threshold value $\Delta T2$ are used in step S44 and step S46, respectively). Hereinafter, referring to FIG. 10 and FIG. 11, a significance of this change will be described.

Figure 10:
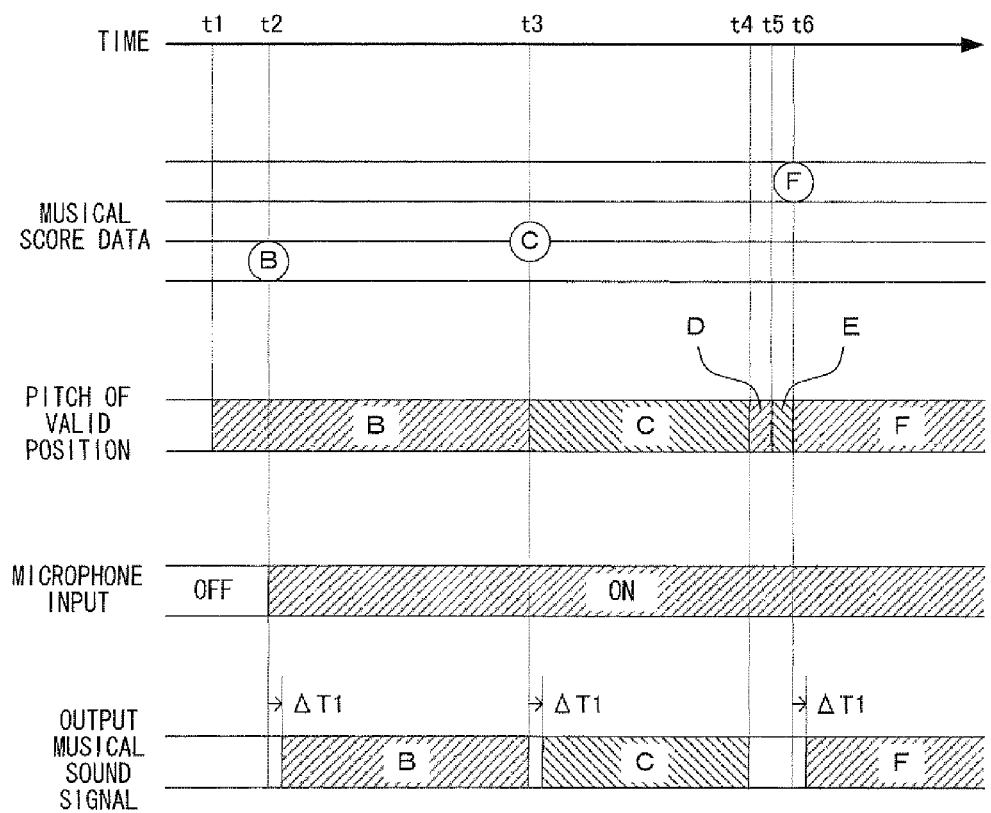
FIG. 10 shows an example of a musical sound signal outputted upon a certain input operation.

Firstly, referring to FIG. 10, a case where the user performs as directed by a musical score will be described. Here, it is assumed that pitches are arranged in order of "B", "C", and "F" on the musical score, and that the user performs accordingly.

First, at a time t1, the user moves, to the valid position, the second pipe 42b which corresponds to the pitch "B", as a preparation for outputting a musical sound signal of the pitch "B". Then, at a time t2, the user begins to blow on the microphone hole 33. As a result, the input duration time counter starts counting up from the time t2. At this time, since a pitch (in this case, "B") of the musical score at which the user should perform coincides with a pitch (in this case, "B") of a pipe positioned at the valid position, an output of a musical sound signal of the pitch "B" is started at the time when a time corresponding to the first threshold value $\Delta T1$ has elapsed from the time t2.

Thereafter, while the user continues to blow on the microphone hole 33, the user moves, to the valid position, the third pipe 42c which corresponds to the pitch "C" at a time t3. As a result, at the time t3, the input duration time counter is reset and starts counting up again. At this time, since a pitch (in this case, "C") of the musical score at which the user should perform coincides with a pitch (in this case, "C") of a pipe positioned at the valid position, an output of a musical sound signal of the pitch "C" is started at the time when a time corresponding to the first threshold value $\Delta T1$ has elapsed from the time t3.

Thereafter, while the user continues to blow on the microphone hole 33, the user moves, to the valid position, the sixth pipe 42f which corresponds to the pitch "F" at a time t6. However, when the user moves the sixth pipe 42f to the valid position through a slide operation, the fourth pipe 42d and the fifth pipe 42e cross over the valid position quickly. Specifically, during a period from a time t4 to a time t5, the fourth pipe 42d is positioned at the valid position, and during a period from the time t5 to the time t6, the fifth pipe 42e is positioned at the valid position.

Here, it is assumed that a period from the time t4 to the time t5 and a period from the time t5 to the time t6 are both longer than a time corresponding to the first threshold value $\Delta T1$ and shorter than a time corresponding to the second threshold value $\Delta T2$. In this case, if an output of a musical sound signal of the pitch "D" is started at the time when a time corresponding to a first threshold value $\Delta T1$ has elapsed from the time t4, the user has an impression that operability is not excellent since the musical sound signal of the pitch "D" is outputted despite the intention of the user. However, in the present embodiment, since a pitch (in this case, "C") of the musical score at which the user should perform does not coincide with a pitch (in this case, "D") of a pipe positioned at the valid position, the musical sound signal of the pitch "D" is not outputted until a time corresponding to a second threshold value $\Delta T2$ has elapsed from the time t4. Therefore, it does not occur that the musical sound signal of the pitch "D" is outputted despite the intention of the user. Similarly, during the period from the time t5 to the time t6, it does not occur that a musical sound signal of the pitch "E" is outputted despite the intention of the user.

Figure 11:
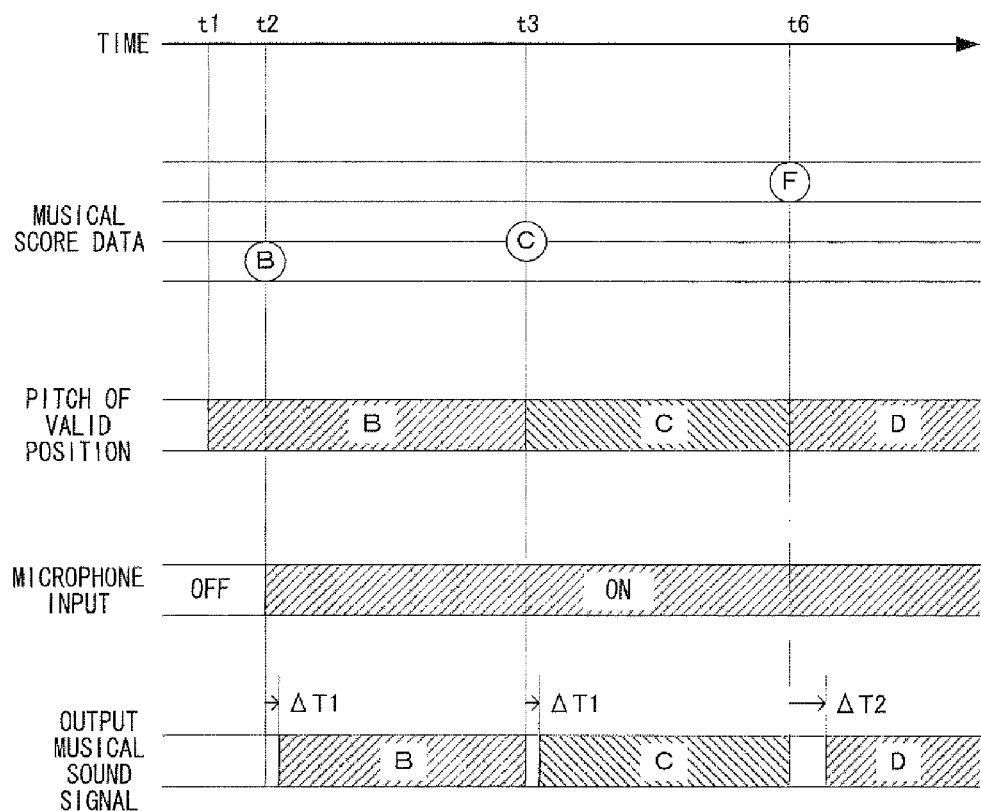
FIG. 11 shows an example of a musical sound signal outputted upon a certain input operation.

Next, referring to FIG. 11, a case where the user intentionally performs in a manner different from that directed by the musical score will be described. Here, it is assumed that pitches are arranged in order of "B", "C", and "F" on the musical score, and that the user performs in order of "B", "C", and "D".

At the time t1, the user moves, to the valid position, the second pipe 42b which corresponds to the pitch "B", as a preparation for outputting a musical sound signal of the pitch "B". Then, at the time t2, the user begins to blow on the microphone hole 33. As a result, the input duration time counter starts counting up from the time t2. At this time, since a pitch (in this case, "B") of the musical score at which the user should perform coincides with a pitch (in this case, "B") of a pipe positioned at the valid position, an output of a musical sound signal of the pitch "B" is started at the time when a time corresponding to the first threshold value $\Delta T1$ has elapsed from the time t2.

Thereafter, while the user continues to blow on the microphone hole 33, the user moves, to the valid position, the third pipe 42c which corresponds to the pitch "C" at a time t3. As a result, at the time t3, the input duration time counter is reset and starts counting up again. At this time, since a pitch (in this case, "C") of the musical score at which the user should perform coincides with a pitch (in this case, "C") of a pipe positioned at the valid position, an output of a musical sound signal of the pitch "C" is started at the time when a time corresponding to the first threshold value $\Delta T1$ has elapsed from the time t3.

Thereafter, while the user continues to blow on the microphone hole 33, the user moves, to the valid position, the fourth pipe 42d which corresponds to the pitch "D" at a time t6. As a result, at the time t6, the input duration time counter is reset and starts counting up again. At this time, since a pitch (in this case, "F") of the musical score at which the user should perform does not coincide with a pitch (in this case, "D") of a pipe positioned at the valid position, an output of a musical sound signal of the pitch "D" is started at the time when a time corresponding to the second threshold value $\Delta T2$ elapses from the time t6.

Thus, even when a pitch of a musical score does not coincide with a pitch at which the user intends to perform, an output of a musical sound signal corresponding to the pitch at which the user intends to perform is started at the time when a time corresponding to the second threshold value $\Delta T2$ has elapsed. Therefore, the user can perform as directed by a musical score, and also, can make any arrangements to perform a musical piece.

As described above, by changing the threshold value used in the subsequent step depending on a result of the determination in step S42 (using the first threshold value $\Delta T1$ and the second threshold value $\Delta T2$ respectively in step S44 and step S46), there can be realized at the same time (1) an improvement of operability for performing as directed by a musical score, and (2) enabling a musical piece to be performed without being limited by a musical score.

As described above, according to the present embodiment, the user can move the pan flute 42 in the horizontal direction on the screen through a slide operation using the touch panel 15, and by blowing on the microphone hole 33 in a state where a pipe whose sound the user intends to produce is positioned at the valid position, the user can cause a musical sound signal of a pitch corresponding to the pipe to be outputted. Thus, the user can cause a musical sound signal of a sound of the pan flute to be outputted through an intuitive operation which makes the user feel as if actually playing the pan flute.

Note that in order to enable a more intuitive operation, it is preferable that the valid position includes a point, on the screen, which is the nearest to the position of the microphone hole 33 (that is, the position of the microphone 37). For example, as in the present embodiment, in the case where the valid position is linear, it is preferable that the valid position is set so as to pass through the point, on the screen, which is the nearest to the position of the microphone hole 33 (see FIG. 4). Thus, by blowing on the microphone hole 33, the user can feel as if blowing on a pipe positioned at the valid position, thereby enabling a more intuitive operation.

Moreover, according to the present embodiment, since the user can move the pan flute 42 in the horizontal direction on the screen through a slide operation using the touch panel 15, the user can perform even if the pan flute 42 is a horizontally long pan flute having a large number of pipes which cannot be included within one screen.

Moreover, according to the present embodiment, since the user can perform by viewing only the valid position and the neighborhood thereof, the user does not need to look this way and that way during a performance. Therefore, operation is easy, and errors in operation decrease. Such an effect can be more remarkably obtained in the case where the screen is a wide screen which is wider than high.

Moreover, according to the present embodiment, since an indicator (valid position display image 43) which indicates the valid position is displayed, the user can easily grasp the valid position. In addition, since the color of the position display image 43 is changed depending on the color of a pipe positioned at the valid position, the user can easily grasp which pipe is positioned at the valid position, based on the color of the valid position display image 43. Note that in order to achieve the same effect, a pipe positioned at the valid position may be displayed in an emphasized manner (for example, a change in color is made only to the pipe, or only the pipe is made to have a bold outline) so as to be distinguished from the other pipes, instead of changing the color of the valid position display image 43.

Note that the above embodiment is merely an example, and various examples of variations are possible. Hereinafter, various examples of variations of the above embodiment will be described.

In the present embodiment, two screens, i.e., the first LCD 11 and the second LCD 12 are used. However, in other embodiments, only one of the screens may be used.

In the present embodiment, the touch panel 15 is used to move the pan flute 42. However, other input devices may be used to move the pan flute 42, instead of the touch panel 15. For example, a pointing device (mouse, trackball, touch panel, touch pad, or the like) capable of designating a position on a screen may be used to move the pan flute 42, or an input device, such as the cross switch 14a, capable of designating a direction may be used to move the pan flute 42.

In the present embodiment, a musical sound signal is generated in accordance with an input from a microphone. However, in other embodiments, an input from other input devices may be used to generate a musical sound signal, instead of a microphone. For example, a musical sound signal may be generated in accordance with a predetermined button operation (for example, pressing the A-button 14d).

In the present embodiment, the case where the pan flute is used for a performance is described. However, the present invention is not limited to the pan flute and can be applied to any other musical instruments (including imaginary musical instruments). Particularly, the present invention is suitable for instruments, such as the pan flute and the harmonica, which are moved by a performer in an up-and-down or side-to-side direction during a performance.

In the present embodiment, the musical score 40 and the character 41 are displayed. However, in other embodiments, the musical score 40 and/or the character 41 may not be displayed.

In the present embodiment, the color of the valid position display image 43 is changed in accordance with the color of a pipe positioned at the valid position. However, in other embodiments, the color of the valid position display image 43 may be fixed. In addition, the colors of the six pipes may be the same. In addition, the valid position display image 43 may not be displayed.

In the present embodiment, the user basically plays the pan flute based on the musical score data. However, in other embodiments, the musical score data may not be present such that the user can play the pan flute in a completely free manner.

In the present embodiment, the threshold value used in the subsequent step is changed depending on a result of the determination in step S42 (the first threshold value ΔT1 and the second threshold value ΔT2 are used in step S44 and step S46, respectively). However, this is not indispensable and a common threshold value may be used.

In the present embodiment, the pan flute is moved in the horizontal direction on the screen in accordance with a slide operation performed in a side-to-side direction by the user. However, in other embodiments, a musical instrument may be moved in the vertical direction on the screen in accordance with a slide operation performed in an up-and-down direction by the user. Moreover, a musical instrument may be moved in any direction on the screen in accordance with a slide operation performed in any direction by the user.

In the present embodiment, the valid position is fixed. However, this is not indispensable, and for example, the valid position may be such that the user can move the valid position to a desired position before starting a performance.

Figure 12:
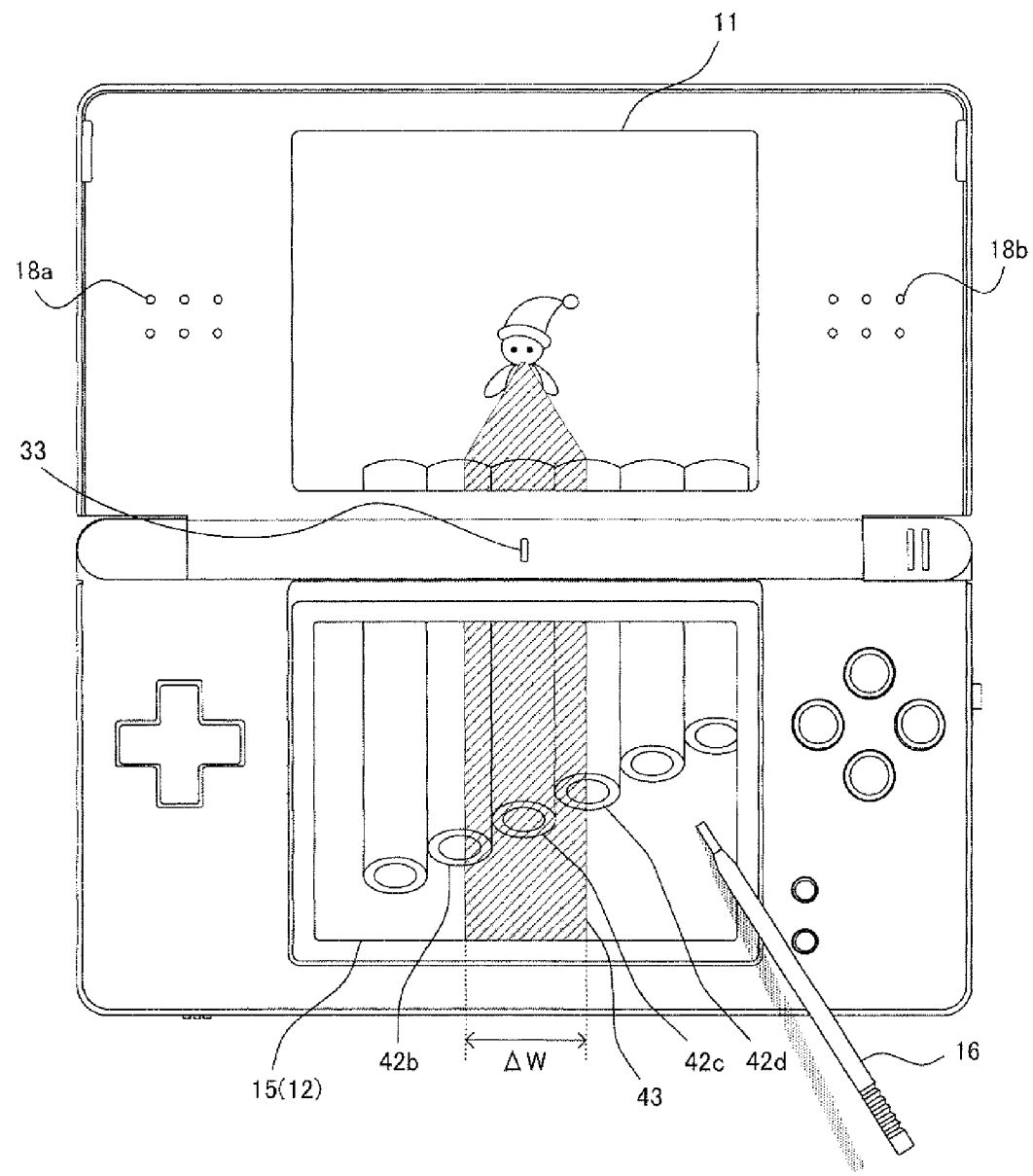
FIG. 12 shows an example of an image displayed during a play of a game in an example of variations.
Figure 13:
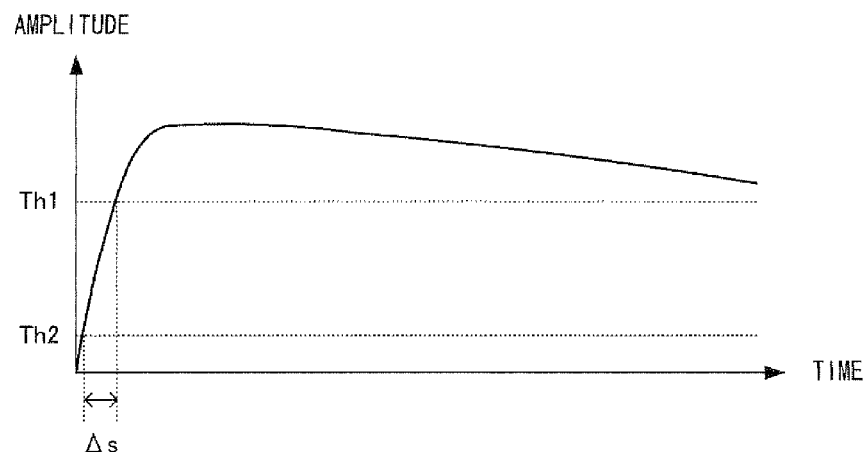
FIG. 13 shows an example of a parameter for determining a width of a valid position display image.

In the present embodiment, the valid position is linear. However, this is not indispensable, and as shown in FIG. 12, the width of the valid position (or valid region) (that is, a width ΔW of the valid position display image 43) may be increased such that a plurality of pipes can be positioned at the valid position at the same time. In this case, a musical sound signal obtained by combining a plurality of pitches which respectively correspond to a plurality of pipes (in an example in FIG. 12, second pipe 42b, third pipe 42c, and fourth pipe 42c) positioned at the valid position, may be outputted. In addition, the size (width, height, or the like) of the valid position may be changed in accordance with an input operation (microphone input, touch input, or button input) from the user. For example, as shown in FIG. 13, if a time ΔS taken for the amplitude of a signal inputted from the microphone 37 to increase from a predetermined threshold value Th1 to a predetermined threshold value Th2 is longer (that is, the user blows relatively slowly), the width of the valid position may be larger. In addition, for example, if a touch position is nearer to the top edge of the touch panel 15 when the user performs the aforementioned slide operation, the width of the valid position may be larger.

Figure 14:
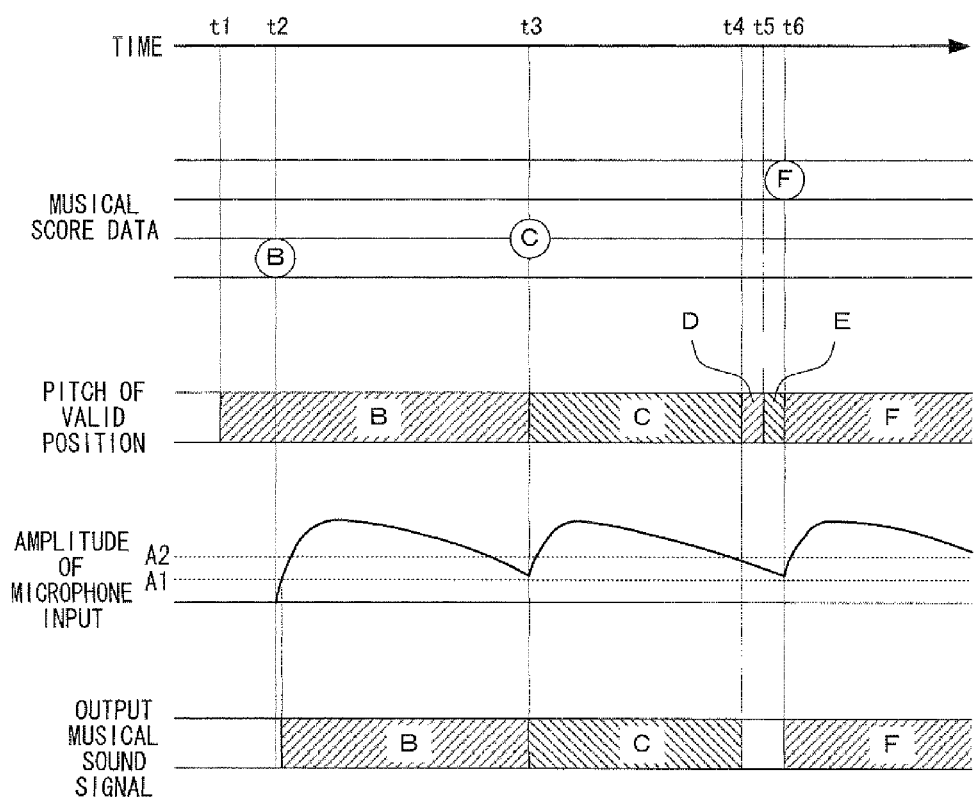
FIG. 14 shows an example of a musical sound signal outputted upon a certain input operation in an example of variations.
Figure 15:
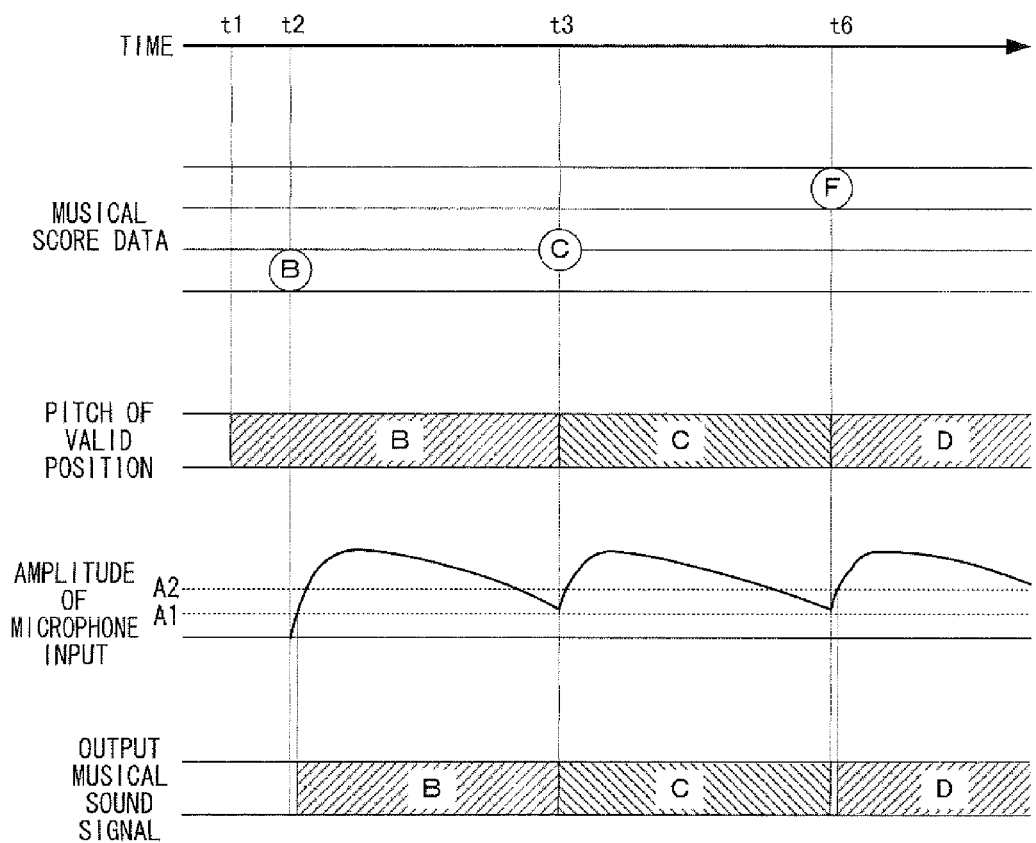
FIG. 15 shows an example of a musical sound signal outputted upon a certain input operation in an example of variations.

In the present embodiment, it is determined whether or not a duration time of a microphone input has become equal to or larger than a predetermined threshold value, and when a duration time of a microphone input has become equal to or larger than the predetermined threshold value, a musical sound signal corresponding to a pitch of a pipe positioned at the valid position is outputted. However, in other embodiments, a musical sound signal corresponding to a pitch of a pipe positioned at the valid position may be outputted in accordance with a result of a determination having other conditions. For example, when the amplitude of a microphone input (input signal from the microphone 37) has become equal to or larger than a predetermined amplitude threshold value, a musical sound signal corresponding to a pitch of a pipe positioned at the valid position may be outputted. In this case, similarly to the present embodiment, the amplitude threshold value may be changed depending on a result of the determination in step S42. For example, as shown in FIG. 14, if a pitch of a musical score at which the user should perform coincides with a pitch of a pipe positioned at the valid position, a musical sound signal may be outputted when the amplitude of a microphone input has become equal to or larger than a first amplitude threshold value A1, and if a pitch of a musical score at which the user should perform does not coincide with a pitch of a pipe positioned at the valid position, a musical sound signal may be outputted when the amplitude of a microphone input has become equal to or larger than a second amplitude threshold value A2 which is larger than the first amplitude threshold value A1. Thus, as shown in FIG. 14, when the user tries to perform as directed by a musical score, a musical sound signal of a pitch which is against the user's intention can be prevented from being erroneously outputted, and at the same time, as shown in FIG. 15, even when a pitch of a musical score does not coincide with a pitch at which the user intends to perform, a musical sound signal corresponding to the pitch at which the user intends to perform can be outputted.

In the present embodiment, one game apparatus 10 by itself functions as a musical sound generation apparatus. However, this is not indispensable, and a plurality of information processing apparatuses work in a cooperating manner to function as a musical sound generation apparatus. For example, a first information processing apparatus may have a function of displaying the pan flute or the like on the screen and a function of receiving a touch input and a microphone input, and a second information processing apparatus may have a function of generating a musical sound signal in accordance with instructions from the first information processing apparatus.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a musical sound generation program for generating a musical sound signal in accordance with an input operation performed by a user, the musical sound generation program causing the computer of an information processing apparatus to perform functionality comprising:
    displaying on a screen a plurality of images which respectively correspond to a plurality of pitches of sound;
    moving positions of the plurality of images displayed on the screen in accordance with a first input performed by the user via a first input device;
    detecting that at least one image of the plurality of images which are moved is positioned at a predetermined position on the screen;
    determining whether or not a second input is being performed by the user via a second input device; and
    generating, when a result of the determination is positive, based on the at least one image which is detected as being positioned at the predetermined position on the screen, the musical sound signal of the pitch of sound corresponding to the at least one image.

2. The non-transitory computer-readable storage medium according to claim 1, wherein
    the plurality of images are moved as one unit in accordance with the first input.

3. The non-transitory computer-readable storage medium according to claim 1, wherein
    the plurality of images are displayed such that the plurality of images are arranged in order of the pitch of sound.

4. The non-transitory computer-readable storage medium according to claim 1, wherein
    the first input device is a pointing device, and
    when the user moves a position on the screen designated by the pointing device, the positions of the plurality of images are moved accordingly.

5. The non-transitory computer-readable storage medium according to claim 4, wherein
the first input device is a touch panel provided on the screen.

6. The non-transitory computer-readable storage medium according to claim 1, wherein
the second input device is a microphone, and
whether or not an input to the microphone is being performed by the user is determined.

7. The non-transitory computer-readable storage medium according to claim 6, wherein
the predetermined position includes a point, on the screen, which is the nearest to the microphone.

8. The non-transitory computer-readable storage medium according to claim 1, wherein the musical sound generation program further causes the computer to perform functionality comprising:
determining whether or not the pitch of sound corresponding to the at least one image which is detected as being positioned at the predetermined position on the screen coincides with a pitch of sound designated by musical score data stored in a storage device,
generating, when a result of the pitch of sound determination is positive, if an input value based on the second input is equal to or larger than a first threshold value, the musical sound signal of the pitch of sound corresponding to the at least one image, and
generating, when a result of the pitch of sound determination is negative, if the input value is equal to or larger than a second threshold value which is larger than the first threshold value, the musical sound signal of the pitch of sound corresponding to the at least one image.

9. The non-transitory computer-readable storage medium according to claim 1, wherein
a predetermined indicator is displayed at the predetermined position.

10. The non-transitory computer-readable storage medium according to claim 9, wherein
a color of the indicator is changed in accordance with the at least one image which is detected as being positioned at the predetermined position on the screen.

11. The non-transitory computer-readable storage medium according to claim 1, wherein
the musical sound generation program further causes the computer to perform functionality comprising changing a size of the predetermined position in accordance with one of the first input and the second input.

12. A musical sound generation apparatus having one or more processors and configured to generate a musical sound in accordance with an input operation performed by a user, the musical sound generation apparatus comprising:
a display control unit for displaying on a screen a plurality of images which respectively correspond to a plurality of pitches of sound;
a movement control unit for moving, via the one or more processors, positions of the plurality of images displayed on the screen by the display control unit, in accordance with a first input performed by the user via a first input device;
a detection unit for detecting that at least one image of the plurality of images which are moved by the movement control unit is positioned at a predetermined position on the screen;
an input determination unit for determining whether or not a second input is being performed by the user via a second input device; and
a generation unit for, when a result of the determination by the input determination unit is positive, based on the at least one image which is detected by the detection unit as being positioned at the predetermined position on the screen, generating the musical sound signal of the pitch of sound corresponding to the at least one image.

13. A musical sound generation system, comprising:
a display device having a screen configured to display image data; and
a musical sound generation apparatus having one or more processors and configured to generate a musical sound in accordance with an input operation performed by a user, the musical sound generation apparatus comprising:
a display control unit for displaying on the screen a plurality of images which respectively correspond to a plurality of pitches of sound;
a movement control unit for moving, via the one or more processors, positions of the plurality of images displayed on the screen by the display control unit, in accordance with a first input performed by the user via a first input device;
a detection unit for detecting that at least one image of the plurality of images which are moved by the movement control unit is positioned at a predetermined position on the screen;
an input determination unit for determining whether or not a second input is being performed by the user via a second input device; and
a generation unit for, when a result of the determination by the input determination unit is positive, based on the at least one image which is detected by the detection unit as being positioned at the predetermined position on the screen, generating the musical sound signal of the pitch of sound corresponding to the at least one image.

14. A musical sound generation method for generating a musical sound signal in accordance with an input operation performed by a user, the method implemented by an information processing apparatus having one or more processors, the method comprising:
displaying on a screen a plurality of images which respectively correspond to a plurality of pitches of sound;
moving, via the one or more processors, positions of the plurality of images displayed on the screen in accordance with a first input performed by the user via a first input device;
detecting that at least one image of the plurality of images which are moved is positioned at a predetermined position on the screen;
determining whether or not a second input is being performed by the user via a second input device; and
generating, when a result of the determination is positive, based on the at least one image which is detected as being positioned at the predetermined position on the screen, the musical sound signal of the pitch of sound corresponding to the at least one image.

* * * * *